June 4, 1968 R. A. SPIER 3,386,337
PORTABLE MILLING TOOL

Filed April 5, 1966 2 Sheets-Sheet 1

INVENTOR
RAYMOND A. SPIER
BY
ATTORNEY

INVENTOR
RAYMOND A. SPIER

BY

ATTORNEYS

United States Patent Office 3,386,337
Patented June 4, 1968

3,386,337
PORTABLE MILLING TOOL
Raymond A. Spier, Huntsville, Ala., assignor to the United States of America as represented by the Administrator of the National Aeronautics and Space Administration
Filed Apr. 5, 1966, Ser. No. 540,414
1 Claim. (Cl. 90—12)

ABSTRACT OF THE DISCLOSURE

A portable milling tool having an expandable mandrel which fits within the end of a tube and presses against the inside surface to round the end. The tool has a router revolving about the center of the mandrel to mill the end edge of the tube.

---

The invention described herein was made by an employee of the United States Government and may be manufactured and used by or for the Government for governmental purposes without the payment of any royalties thereon or therefor.

This invention relates to a portable milling tool for milling tube or pipe ends to a desired shape and thickness.

It is often necessary in butt welding tubes or pipes to reduce the thickness of the tube's edges so they may be welded together with best results. While portable machines have been developed to accomplish this purpose, they are unduly complex and often difficult to operate under field conditions.

Some of the prior machines for example run on tracks secured to the exterior of the pipe and operate on the assumption that the pipe is perfectly round. If the pipe were out-of-round the depth of the edge cut would vary according to the distance the section of pipe being cut is from the fixed center about which the machine operates. Another type of machine is characterized by a support for the cutter which bears upon a small arc of a tube being cut. The support of this type has rollers engaging the inner and outer walls of the tube for guiding the machine progressively about the tube. While this last type will have better results on out-of-round tubes than the type running on tracks secured to the exterior of the tube, the resultant tolerances and finish still often require further hand grinding operations.

Accordingly, it is an object of the present invention to provide a tool of easily constructed parts for milling tube ends and obtaining superior results than obtain herebefore.

Another object is to provide a portable machine for accurately milling out-of-round tube ends while still obtaining close tolerances and a uniform finish.

Other objects, features, and advantages of the present invention will become apparent as the description proceeds.

The present invention is capable of producing the desired profile on a tube end by utilization of a milling head support arm which is pivotally mounted on an expandable mandrel inserted in the tube end so as to rotate about the true center of the tube. The mandrel has a plurality of elements which are forced against the inner surface of the tube with sufficient force to round the typical out-of-round tube. The milling head powers a cutter which cuts the tube end perpendicular to the tube's transverse axis, and the support arm guides the milling head and cutter concentrically to the internal longitudinal center axis of the tube so as to maintain a uniform cut around the tube. The desired profile and end cut may be produced by one rotation about the tube end or may be done in a series of cuts.

This will be more readily understood by the following detailed description when taken together with the accompanying drawings in which.

Figure 1:
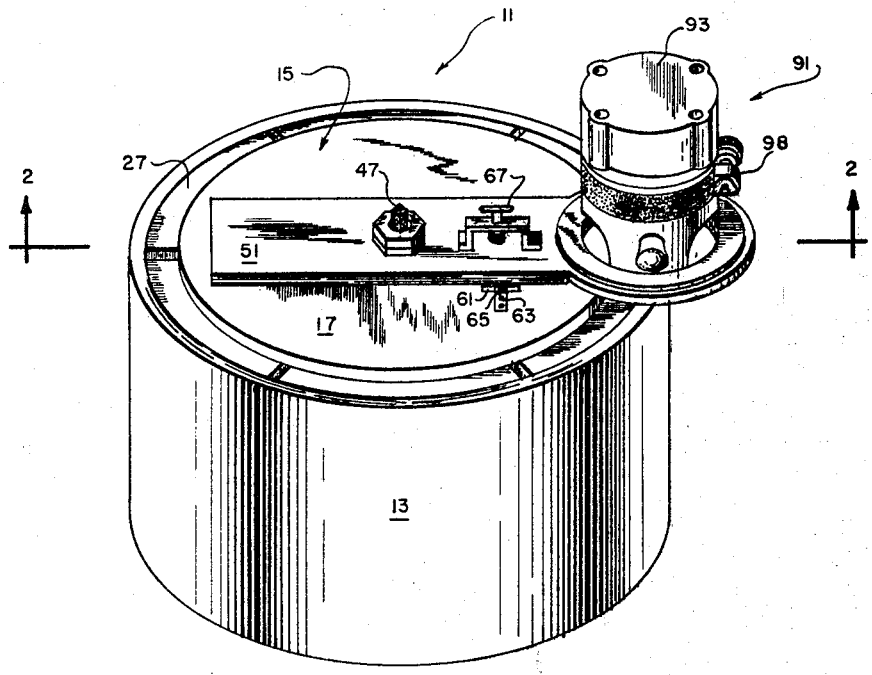
FIGURE 1 is a perspective view of a milling tool of the present invention mounted on a tube end.
Figure 2:
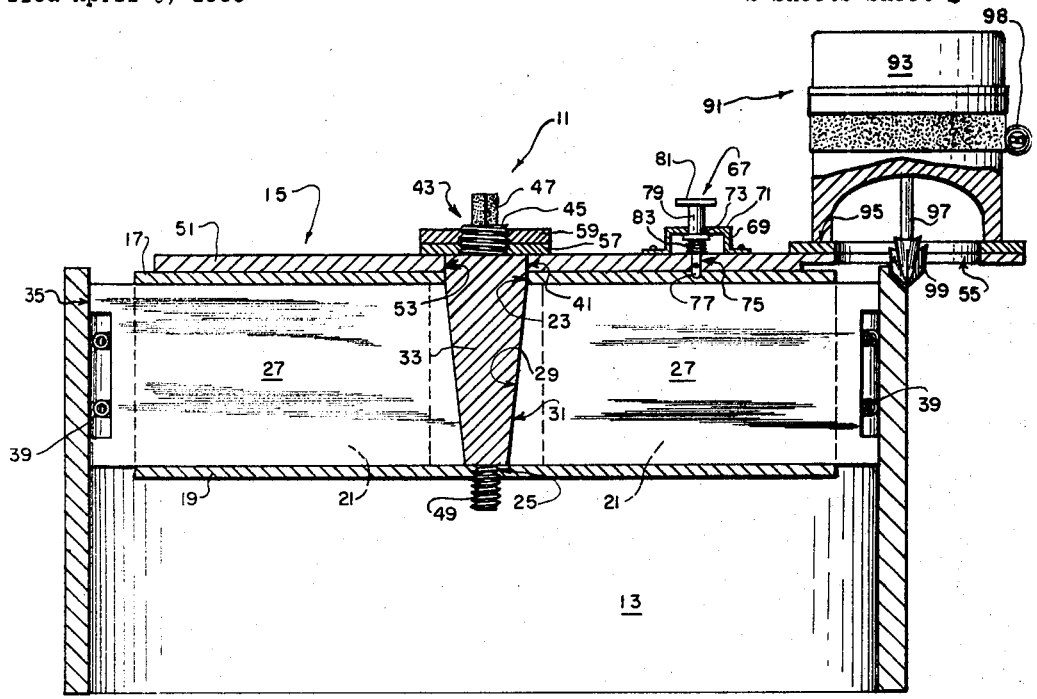
FIGURE 2 is an elevational cross-sectional view taken along line 2—2 of FIGURE 1, with portions shown whole for clarity.

Referring now to the drawings and in particular to FIGURES 1 and 2 which shows the milling tool 11 of the present invention mounted on a tube or pipe end 13.

Figure 3:
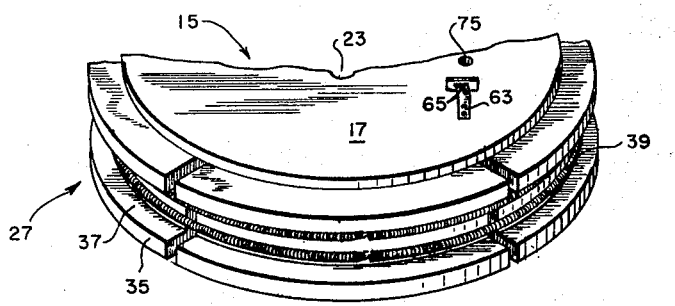
FIGURE 3 is a partial perspective view of the expandable mandrel portion of the milling tool of FIGURE 1.
Figure 4:
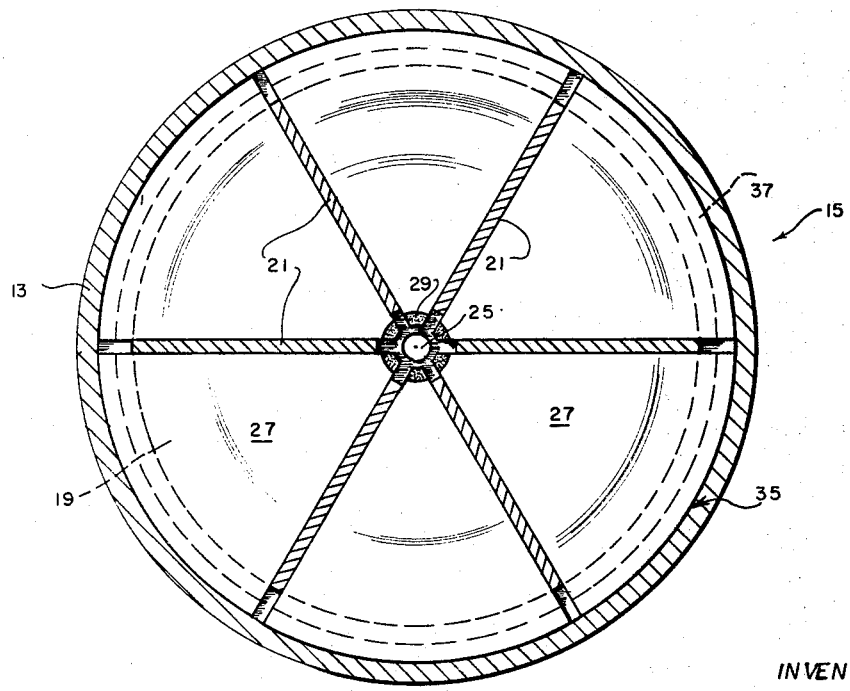
FIGURE 4 is transverse plan sectional view of the expandable mandrel portion within a tube with parts removed for clarity.

The milling tool 11 is held partially within the end opening of the tube 13 by an expandable mandrel 15 as as shown best in FIGURE 2. The mandrel 15 as shown in FIGURES 2, 3, and 4 is composed of circular upper and lower plates 17 and 19 separated by six partitions 21 which extend radially from the center axis of the plates 17 and 19 to form six triangular compartments. A circular hole 23 is in the center of the upper plate 17 and a threaded circular hole 25 is in the center of the lower plate 19. The partitions 21 end a short distance outwardly from the center holes 23 and 25 so a passageway will in effect extend through the center of the mandrel 15.

A plurality of substantially triangular or pie-shaped blocks 27 are inserted within the compartments formed by the plates 17 and 19 and partitions 21. Each block 27 has an apex surface 29 which is complementary to the conical surface 31 of a cam element 33 which extends through the passageway. The edge surface 35 of the blocks 27 opposite the apex 29 is curved and the curvature is selected so its radius is equal to the internal radius of the tube to be milled. The curved edge surface 35 of the blocks 27 has a groove 37 therein whereby coiled springs 39 may be used to encircle the outer edge of the blocks 27 within the groove 37 to prevent the blocks 27 from falling out of their compartments as well as tending to urge them inwardly so their apex surface 35 will contact the conical surface 31 of the cam element 33, as illustrated in FIGURE 2.

The cam element 33 is characterized by an upper cylindrical portion 41 and a lower conical portion 31 which slopes inwardly from the cylindrical portion 41. Extending axially from the cylindrical portion 41 is a bolt like shaft 43 which has a screw thread along its lower circular part 45 and flat faces 47 along its upper part. A circular threaded shaft 49 also extends axially downward from the conical portion 31.

As shown in FIGURES 1 and 2, an elongated arm 51 extends across the top surface of the upper mandrel plate 15 and has one end cantilevered outwardly from that plate. The arm is characterized by having a hole 53 substantially between its ends which has a diameter equal to the diameter of the center hole 23 of the upper plate 17. The cantilevered end of the arm 51 is enlarged and has a rather large hole 55 therein so as to have the appearance of a ring.

The cylindrical portion 41 of the cam element 33 is slidably received within the center hole 23 of the upper plate 17 as well as in the central hole 53 of the elongated arm 51. A nut 57 is screwed down on the threaded portion 45 of the upper shaft 43 lightly against the upper surface of the arm 51 so the arm 51 may rotate freely about the cylindrical portion 41 of the cam element 33. Another nut 59 is screwed down on the threaded portion 45 of the shaft 43 so as to be tight against the first nut 57 to prevent it from moving.

The lower threaded shaft 49 extending from the conical portion 31 of the cam element 33 is screwed into the center hole 25 of the lower plate 19. It should now be obvious that as the cam element 33 is screwed down into the lower plate 19, the conical portion 31 of the cam element 33 rotates against the complementary curved apex surfaces 29 of the block elements 27 so as to force them outwardly from their compartments. Also as the cam element 33 is screwed upwardly from the lower plate 19, the coil springs 39 will force the blocks 27 inwardly against the retreating conical surface 31.

The top surface of the upper plate 17 as shown best in FIGURES 1 and 3 has a T-shaped groove 61 therein between the center hole 53 and outer edge. Within the main stem of the groove 61 a flat spring 63 is fastened which is raised upwardly at a slight angle at one end 65 so as to engage the edge of the elongated arm 51. The arm 51 may be released for movement in a clockwise direction by pressing the raised edge 65 into the groove 61.

Another stop mechanism for the elongated arm is a plunger device 67 shown best in FIGURE 2. The plunger device 67 has two vertical legs 69, joined to the top surface of the elongated arm 51 which supports a cross member 71 having a vertical hole 73. The elongated arm 51 also has a vertical hole 75 which is aligned with the hole 73 in the cross member 71, and the top surface of the upper plate 17 of the mandrel 15 has a circular recess 77 which is also aligned with the other holes. A rod 79, with a handle 81 thereon at its top, extends through the cross member hole 73 and into the aligned hole 75 within the elongated arm 51. The lower portion of the rod is smaller than the upper portion so a spring 83 may encircle the smaller rod portion and react between the large portion of the rod and the top surface of the elongated arm 17. The handle of the rod 81 may be pushed down so that the rod 79 will extend through the hole 75 in the elongated arm 51 and into the recess 77 within the upper circular plates 17. If the handle is released, the spring 83 will automatically force the rod 79 upward from the recess 75 and into the arm 51 so the arm 51 will be free to rotate. The recess hole 77 within the upper plate 17 and the spring 63 are located so both may function at the normal start position of the elongated arm 51 when the milling head 91 is started.

As shown best in FIGURE 2, the milling head 91 is a typical power router 93 which is secured to the ring surface 95 of the enlarged and cantilevered arm end. The router's shaft 97 extends parallel to the center of rotation of the arm 51 and places its cutter 99 into engagement with the tube edge.

*Operation*

In operation, the expandable mandrel 15 of the tool 11 is positioned within the end opening of a tube or pipe 13 to be milled. The operator using a wrench (not shown) upon the flat faces 47 of cam element 33 rotates the cam element 33 so it will be screwed downwardly into the center hole 25 of the lower plate 19. The conical portion 31 of the cam element 33 thus engages the apex surfaces 29 of the blocks 27 and forces the curved surfaces 35 of the blocks 27 into engagement with the internal surface of the tube 13. The cam element 33 should be rotated so that sufficient force is exerted by the blocks 27 to round an out-of-round tube and tightly jam the mandrel 15 within the tube.

The power router 93 of the milling head 91 is started and its shaft 97 is adjusted by the conventional mechanism 98 on the router to place its cutter 99 in engagement with the tube rim in the desired manner. At the same time, the operator pushes the plunger rod 79 downwardly to lock within the recess 77 in the upper plate 17 so as to prevent any movement of the elongated arm 51.

When the cutter element 99 is positioned to a desired depth—the profile of the cut is determined by the shape of the cutter 99—the plunger rod 79 is released. Also, since the router shaft 97 will be rotating in a clockwise direction and this reaction of the cutter 99 will tend to rotate the elongated arm 51 in a clockwise direction, it will also be necessary to press the raised end 65 of the stop spring 63 into its recess 61 to allow the arm 51 to rotate in the desired manner. An operator needs to keep a firm hold on the handles of the router 93 to prevent it from running rapidly around the tube following the pressing of the raised end 65 of the stop spring 63 into its groove 61.

After one revolution of the arm 51, the arm 51 is prevented from further movement by the stopping action of the raised edge 65 of the spring 63. If additional cuts of the tube edge is desired, the operation may be repeated.

Obviously, many modifications and variations of the present invention are possible in light of the above teachings. It is, therefore, to be understood that within the scope of the appended claim the invention may be practiced other than as specifically described.

What is claimed is:

1. A portable milling tool for milling tube ends, comprising:
   an expandable mandrel for gripping the internal surface of a tube to be milled adjacent the end opening thereof;
   a support arm pivotally mounted on said mandrel so as to rotate about the center axis of the tube to be milled and in a plane perpendicular thereto;
   a milling head having a power shaft with a cutter thereon supported on said arm adjacent one end thereof so its power shaft is parallel to the center axis of the tube to be milled and said cutter is adapted to mill the tube wall to a desired shape as said arm rotates;
   said mandrel having upper and lower circular plates with partitions therebetween extending radially from the center axis thereof so as to form a plurality of triangular shaped compartments;
   a hole within the center of the upper plate and a threaded hole within the center of the lower plate;
   said partitions ending outwardly of said holes whereby a passageway is formed through said plates;
   a plurality of substantially triangular shaped blocks, each block slidably fitted apex first within one of said compartments;
   the outer dege of said blocks opposite said apex being curved;
   a cam element extending through said passageway and adapted to force said blocks outwardly from said compartments and into contact with the inner surface of the tube to be milled;
   said cam element having an upper cylindrical portion and a lower conical portion which slopes inwardly from the cylindrical portion;
   a first threaded shaft extending axially upward from the cylindrical portion of the cam element;
   a second threaded shaft extending axially downward from the conical portion of the cam element;
   said support arm extending across the top surface of said upper plate and with one end cantilevered outwardly from the upper plate;
   said support arm having a first circular hole between its ends of a diameter equal to the center hole in upper plate and having its end which cantilevers outwardly enlarged and with a second larger hole so as to form a ring surface which supports said milling head;
   said cylindrical portion of said cam element being slidably received within the center hole in the upper plate as well as in the similar first hole of said arm;
   said second threaded shaft of said cam element screwed into the threaded hole of said lower plate;
   nut means on said first threaded shaft lightly contacting said arm so said arm is free to rotate about said cylindrical portion of said cam element; and the apex edge of said blocks being complementary in shape to the conical portion of said cam element whereby said cam element may be rotated downwardly within the center passageway of said plates to force the blocks outwardly from their compartments in a uniform manner.

References Cited

UNITED STATES PATENTS

| | | | |
|---|---|---|---|
| 2,407,101 | 9/1946 | Rosenboom | 82—4.3 XR |
| 3,067,651 | 12/1962 | Hogden et al. | 90—12 |
| 3,175,465 | 3/1965 | Fuller et al. | 90—12 |

LEONIDAS VLACHOS, *Primary Examiner.*